United States Patent
Muratov et al.

(10) Patent No.: US 10,148,096 B2
(45) Date of Patent: Dec. 4, 2018

(54) WIRELESS OR WIRED POWER DELIVERY USING A CONTROLLABLE POWER ADAPTER

(71) Applicant: MEDIATEK Singapore Pte. Ltd., Solaris (SG)

(72) Inventors: Vladimir A. Muratov, Manchester, NH (US); Anand Satyamoorthy, Somerville, MA (US)

(73) Assignee: MEDIATEK Singapore Pte. Ltd., Solaris (SG)

( * ) Notice: Subject to any disclaimer, the term of this patent is extended or adjusted under 35 U.S.C. 154(b) by 220 days.

(21) Appl. No.: 14/791,918

(22) Filed: Jul. 6, 2015

(65) Prior Publication Data

US 2016/0006267 A1    Jan. 7, 2016

Related U.S. Application Data

(60) Provisional application No. 62/021,293, filed on Jul. 7, 2014.

(51) Int. Cl.
*H02J 5/00* (2016.01)
*H02J 7/02* (2016.01)
(Continued)

(52) U.S. Cl.
CPC .............. *H02J 5/00* (2013.01); *B60L 11/182* (2013.01); *B60L 11/1812* (2013.01); *B60L 11/1838* (2013.01); *H02J 5/005* (2013.01); *H02J 7/025* (2013.01); *H02J 7/04* (2013.01); *H02J 17/00* (2013.01); *H02J 50/10* (2016.02); *H02J 50/80* (2016.02); *B60L 2210/30* (2013.01); *H02J 2007/0096* (2013.01); *H02M 7/02* (2013.01); *H02M 2001/0048* (2013.01); *Y02T 10/7005* (2013.01); *Y02T 10/7072* (2013.01); *Y02T 10/7241* (2013.01); *Y02T 90/121* (2013.01);
(Continued)

(58) Field of Classification Search
CPC .. H02J 5/005; H02J 7/004; H02J 7/025; H02J 7/04; H02J 17/00; H02J 50/10; H02J 50/12; H02J 50/80; H02J 2007/0062; H02J 2007/0096; H04B 5/0031; H04B 5/0037; H04B 5/0075
USPC ......................................................... 307/104
See application file for complete search history.

(56) References Cited

U.S. PATENT DOCUMENTS 5,986,434 A * 11/1999 Roy ................... H02J 7/0091
                                                    320/128
7,786,622 B2 * 8/2010 Swan .................. H02J 5/005
                                                    307/104
(Continued)

FOREIGN PATENT DOCUMENTS

CN         101681189 A        3/2010
CN         102694424 A        9/2012
(Continued)

*Primary Examiner* — Levi Gannon
(74) *Attorney, Agent, or Firm* — Wolf, Greenfield & Sacks, P.C.

(57) ABSTRACT

Some embodiments relate to a system that includes a first device which is a wireless power transmitter or mobile device and a power adapter external to the first device. The power adapter is configured to receive a control signal and to control a DC output voltage of the power adapter based upon the control signal. The first device is configured to send the control signal to the power adapter.

38 Claims, 13 Drawing Sheets

(51) Int. Cl.
*B60L 11/18* (2006.01)
*H02J 7/04* (2006.01)
*H02J 50/10* (2016.01)
*H02J 50/80* (2016.01)
*H02J 17/00* (2006.01)
*H02J 7/00* (2006.01)
*H02M 1/00* (2006.01)
*H02M 7/02* (2006.01)

(52) U.S. Cl.
CPC .......... *Y02T 90/122* (2013.01); *Y02T 90/127* (2013.01); *Y02T 90/128* (2013.01); *Y02T 90/14* (2013.01); *Y02T 90/163* (2013.01)

(56) References Cited

U.S. PATENT DOCUMENTS

| | | | | |
|---|---|---|---|---|
| 9,246,358 | B2* | 1/2016 | Jung | H02J 17/00 |
| 2008/0197808 | A1* | 8/2008 | Banta | E06B 9/56 |
| | | | | 320/134 |
| 2009/0037752 | A1* | 2/2009 | Takiguchi | G06F 1/26 |
| | | | | 713/300 |
| 2010/0264875 | A1* | 10/2010 | Hoffman | H02J 3/14 |
| | | | | 320/111 |
| 2011/0018360 | A1* | 1/2011 | Baarman | H02J 5/005 |
| | | | | 307/104 |
| 2012/0242276 | A1* | 9/2012 | Jung | H02J 5/005 |
| | | | | 320/103 |
| 2013/0026983 | A1* | 1/2013 | Yamamoto | H02J 7/0055 |
| | | | | 320/108 |
| 2013/0207455 | A1* | 8/2013 | Doljack | H02J 7/0036 |
| | | | | 307/9.1 |
| 2014/0136863 | A1* | 5/2014 | Fritchman | G06F 1/26 |
| | | | | 713/310 |
| 2015/0221414 | A1* | 8/2015 | Matsuoka | G06F 1/26 |
| | | | | 174/70 R |
| 2015/0318707 | A1* | 11/2015 | Huynh | H02J 50/12 |
| | | | | 307/104 |

FOREIGN PATENT DOCUMENTS

| | | |
|---|---|---|
| EP | 2348601 A2 | 7/2011 |
| EP | 2503660 A1 | 9/2012 |
| WO | WO 2008137553 A1 | 11/2008 |
| WO | WO 2014077978 A1 | 5/2014 |

* cited by examiner

WIRELESS OR WIRED POWER DELIVERY USING A CONTROLLABLE POWER ADAPTER

CROSS-REFERENCE TO RELATED APPLICATIONS

This application claims priority to U.S. provisional application Ser. No. 62/021,293, titled "Wireless Power Transmitter," filed Jul. 7, 2014, which is hereby incorporated by reference in its entirety.

BACKGROUND

1. Technical Field

The techniques described herein relate generally to power delivery, such as wireless or wired power delivery, and particularly to controlling the output voltage of a power adapter.

2. Discussion of the Related Art

Wireless Power Transfer Systems (WPTS) are gaining increasing popularity as a convenient way to deliver power without wires or connectors. WPTS currently under development in the industry can be separated into two major classes: magnetic induction (MI) systems and magnetic resonance (MR) systems. Both types of systems include a transmitting unit and a receiving unit. Such systems can be used to power or charge mobile devices such as smartphones, among other applications.

Inductive WPTS typically operate in an allocated frequency range of several hundred kilohertz using frequency variation as a power control mechanism. MR WPTS typically operate on a single frequency using input voltage regulation to control output power. In typical applications, MR WPTS operate at a frequency of 6.78 MHz.

Several industry committees such as the Wireless Power Consortium (WPC), the Power Matters Alliance (PMA), and the Alliance for Wireless Power (A4WP) are working on developing international standards for consumer products based on wireless power transfer.

SUMMARY

Some embodiments relate to a system, comprising: a first device, the first device being a wireless power transmitter or mobile device; and a power adapter external to the first device, the power adapter being configured to receive a control signal and to control a DC output voltage of the power adapter based upon the control signal, wherein the first device is configured to send the control signal to the power adapter.

Some embodiments relate to a wireless power transmitter, comprising: an inverter configured to receive an output voltage from a power adapter external to the wireless power transmitter and to produce an alternating signal to transmit wireless power; and a controller configured to send a control signal to the power adapter to control the output voltage of the power adapter.

Some embodiments relate to a power adapter for a first device, the first device being a wireless power transmitter or a mobile device, the power adapter comprising: an AC/DC converter configured to receive an AC voltage and produce a DC output voltage of the power adapter; and a controller configured to receive a control signal from the first device and control the DC output voltage of the power adapter based on the control signal.

Some embodiments relate to a method, comprising: receiving a control signal from a first device, the first device being a wireless transmitter or mobile device; converting an AC voltage into a DC voltage based on the control signal; and powering the first device using the DC voltage.

Some embodiments relate to a method, comprising: sending a control signal to a power adapter to control a DC voltage produced by the power adapter from an AC voltage; receiving the DC voltage; and producing an alternating signal using the DC voltage to transmit wireless power.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1A:
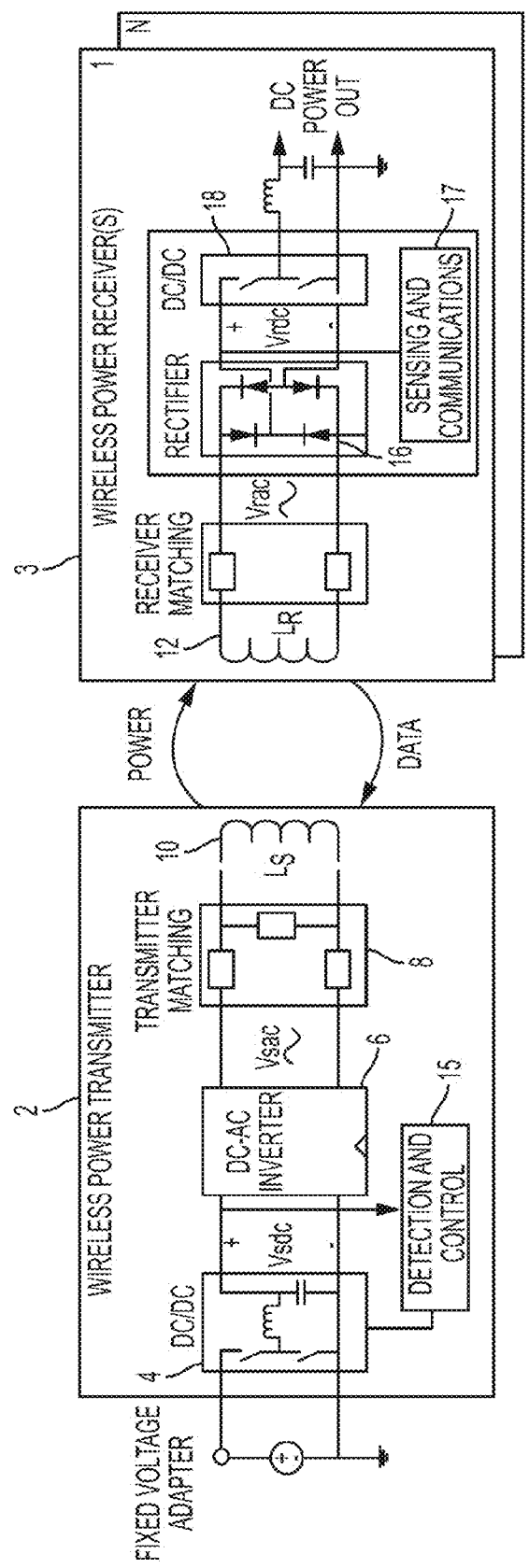
FIG. 1A shows a power chain for a wireless power system.

A power chain for a wireless power system is shown in FIG. 1A. The wireless power transmitter 2 receives a fixed voltage from a DC adapter. The fixed adapter voltage is scaled by a DC/DC converter 4 and applied to an inverter 6. The inverter, in conjunction with the transmitter matching network 8, generates an AC current in the transmit coil 10. The AC current in the transmit coil 10 generates an oscillating magnetic field in accordance with Ampere's law. The oscillating magnetic field induces an AC voltage into a tuned receiver coil 12 of a wireless power receiver 3 in accordance with Faraday's law. The AC voltage induced in the receiver coil 12 is applied to a rectifier 16 that generates an unregulated DC voltage. The unregulated DC voltage is regulated using a DC/DC converter 18, which is filtered and provided to a load.

The wireless power transmitter 2 uses a closed loop power control scheme. The power control scheme allows individual device power needs to be met while providing high efficiency and safe receiver operation. The sensing and communications circuit 17 of the wireless power receiver senses the power demands of the load by measuring the voltage and/or current at the input of the DC/DC converter 18. Instantaneous receiver power is fed back to the wireless power transmitter 2 using a communication channel, shown as the arrow labeled "Data" in FIG. 1A. Any suitable communication channel may be used, and may be in accordance with wireless communication standards such as Bluetooth or Near Field Communication (NFC), or by modulating the receiver coil 12, by way of example and not limitation. The sensing and communications circuit 17 sends data regarding the power demands of the receiver to the wireless power transmitter 2. A detection and control circuit 15 of the wireless power transmitter 2 detects the signal from the wireless power receiver 3 and adjusts the output voltage of the DC/DC converter 4 in order to satisfy the power requirements of the wireless power receiver 3.

Figure 1B:
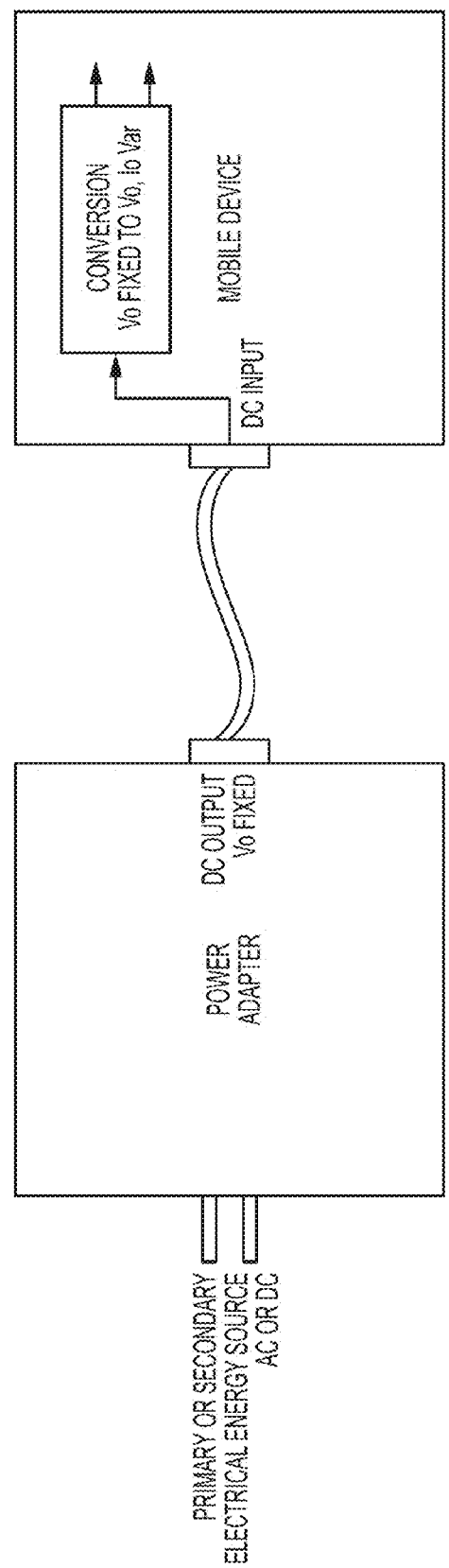
FIG. 1B shows a power adapter for powering a mobile device over a wired connection

FIG. 1B shows a power adapter for powering a mobile device over a wired connection. The power adapter of FIG. 1B has a fixed output voltage. The mobile device of FIG. 1B has a DC/DC converter that receives the fixed output voltage of the power adapter at and may convert it to a selected voltage depending on the requirements of the mobile device.

The inventors have recognized and appreciated that the efficiency of power delivery to a wireless power transmitter or mobile device can be improved by eliminating the DC/DC converter from the wireless power transmitter or mobile device. Efficiency can be increased because energy flows through the DC/DC converter, and the efficiency of the DC/DC converter is less than 100%, so the overall efficiency of the wireless power transmitter or mobile device is reduced by processing energy through the DC/DC converter. Eliminating the need for energy to flow through the DC/DC converter avoids this reduction in efficiency. Further, since the DC/DC converter typically has a low switching frequency, it uses a large power inductor and switches, which are bulky and expensive. Accordingly, the inventors have also recognized and appreciated that the cost, size and/or weight of wireless power transmitters or mobile devices can be reduced if the DC/DC converter is not included.

In some embodiments, a controllable power adapter external to a wireless power transmitter can produce a controlled DC output voltage to provide power to the wireless power transmitter. The controllable power adapter may receive an alternating input voltage (an "AC" input voltage) or a fixed input voltage (a "DC" input voltage) and produce a variable, regulated output voltage, e.g., a substantially constant, or "DC" output voltage, that can be controlled to change voltage values in response to the demands of the wireless power receiver or mobile device. The controllable power adapter may increase its output voltage, decrease its output voltage, or set its output voltage to a selected value. A control communication link may be provided from the wireless power transmitter or mobile device to the controllable power adapter that allows the wireless power adapter or mobile device to send a control signal to the controllable power adapter to control its output voltage. Accordingly, a controllable power adapter that can be controlled to produce a selected DC output voltage can allow eliminating the DC/DC converter 4 from the wireless power transmitter, which can improve efficiency, cost, size and/or weight of the wireless power transmitter.

Figure 2A:
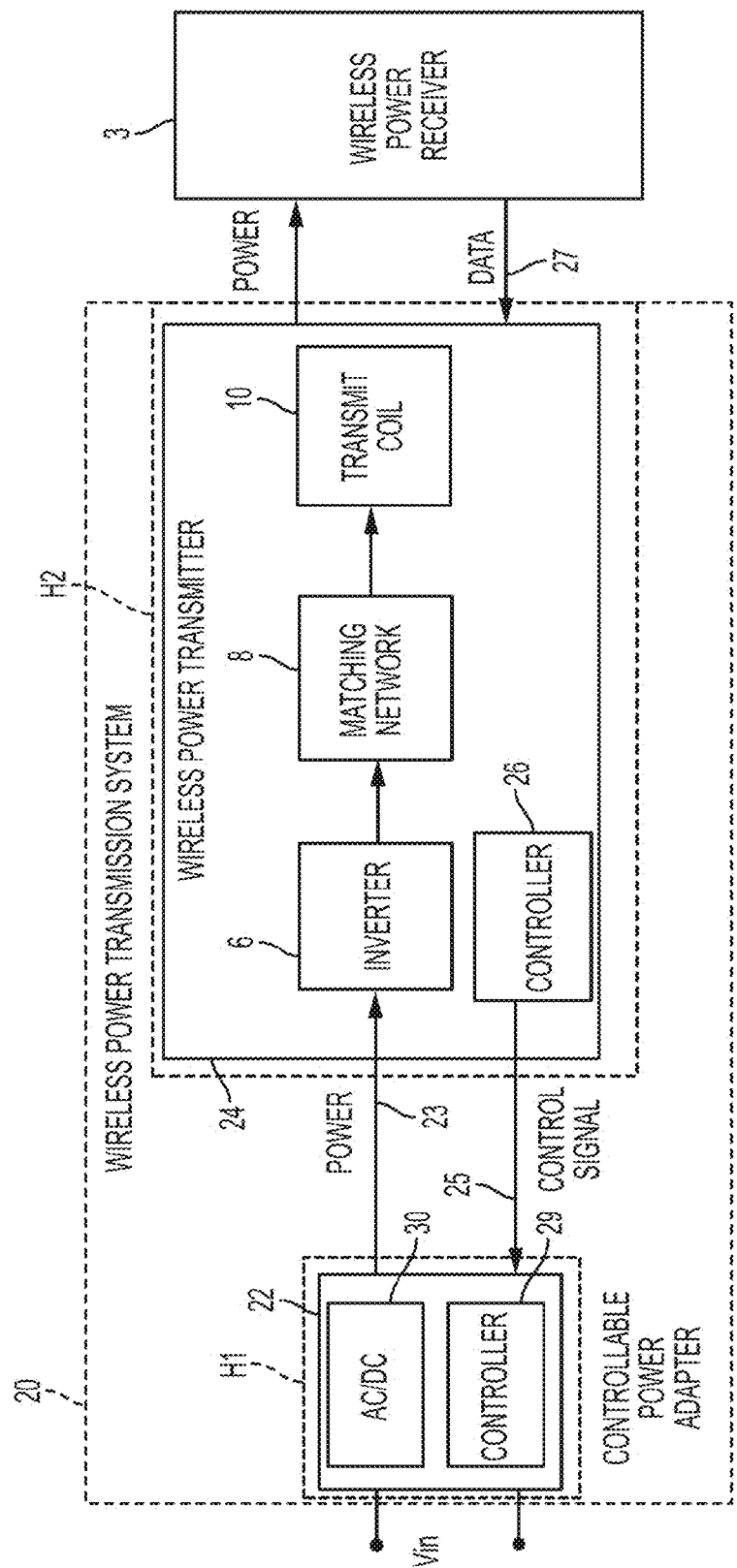
FIG. 2A shows a diagram of a wireless power transmission system including a controllable power adapter that powers a wireless power transmitter.

FIG. 2A shows a diagram of a wireless power transmission system 20 including a controllable power adapter 22 that powers a wireless power transmitter 24. The wireless power transmitter 24 may include an inverter 6, at least one matching network 8 and at least one transmit coil 10, as discussed above with respect to FIG. 1A, and a controller 26. The controllable power adapter 22 may include a controller 29 and an AC/DC power converter 30. In some embodiments, the controllable power adapter 22 and the wireless power transmitter 24 may be disposed within separate housings, and electrically connected to one another via a suitable conductor such as a cord, wire, cable, etc., which may have any suitable length and which may be flexible to allow flexibility in the positioning of the wireless power transmitter. FIG. 2A illustrates that the controllable power adapter 22 has a housing H1 and the wireless power transmitter has a housing H2. The housings may at least partially enclose the controllable power adapter 22 and wireless power transmitter, respectively.

In some embodiments, the controllable power adapter 22 may be configured to receive an AC input voltage, such as a line input voltage, e.g., 120 RMS in the U.S., 220 V RMS or 240 V RMS in Europe, 110 V RMS in Taiwan, etc. The controllable power adapter 22 may be configured to receive any suitable line voltage, and in some embodiment may be configured to accept any of a range of line voltages. The controllable power adapter 22 may include an AC/DC power converter 30, also referred to as a rectifier, for converting the AC input voltage into a regulated DC output voltage. However, the techniques described herein are not limited in this respect, as in some embodiments the controllable power adapter 22 may include a DC/DC power converter for converting a DC input voltage into another DC output voltage. Such a controllable power adapter may receive power from a DC voltage source, such as a battery (e.g., a vehicle battery) or photovoltaic cell, by way of example The controllable power adapter 22 may produce any suitable DC output voltage, depending on the control signal that it receives. In some embodiments, the output voltage of the controllable power adapter 22 may be in the range of 5-20 V. However, the techniques described herein are not limited in this respect, as the controllable power adapter 22 may produce any suitable output voltage.

The controllable power adapter 22 may provide power to the wireless power transmitter through the power path 23. In some embodiments, the power path 23 may include a pair of conductors that provide the DC output voltage of the controllable power adapter 22 to the wireless power transmitter 24. In some embodiments, one of the conductors of the power path 23 (e.g., the negative conductor) may be connected to ground.

As discussed above, the wireless power receiver 3 that receives wireless power from the wireless power transmitter 24 may send a signal to the wireless power transmitter 24 via the data path 27 to indicate an increase or decrease in power, or a desired power level, according to the power demands of the wireless power receiver 3. In some embodiments, the input voltage to the wireless power transmitter 24 provided via the power path 23 is controlled by providing a control signal to the power adapter 22 to control the output voltage of the power adapter 22. The wireless power transmitter 24 may include a controller 26, which may be an analog or digital circuit configured to provide the control signal to the power adapter 22 via the control path 25. The control signal may be produced by the wireless power transmitter 24 based on the signal received from the wireless power receiver 3 indicating the power requirements of the wireless power receiver, and may be the same signal as that received from the wireless power receiver or a different signal. The controller 29 of the controllable power adapter 22 may receive the control signal or a digital control code derived from the control signal, and control the AC/DC converter 30 accordingly to produce a desired output voltage of the controllable power adapter 22, or an increase or decrease in output voltage of the controllable power adapter 22. The controllers 26 and 29 may be configured to perform one or more of sensing/measurement of signals, communication, and control functions, and generally represent modules that perform such functions as described in connection with the embodiments of FIGS. 3-9.

The power path 23 and the control path 25 may be provided through separate links or through a shared link. For example, the power and control paths may be provided via separate wired links, a shared wired link, or the power path 23 may be provided via wired link and the control path 25 may be provided via a wireless link. Examples of such links are described herein.

Figure 2B:
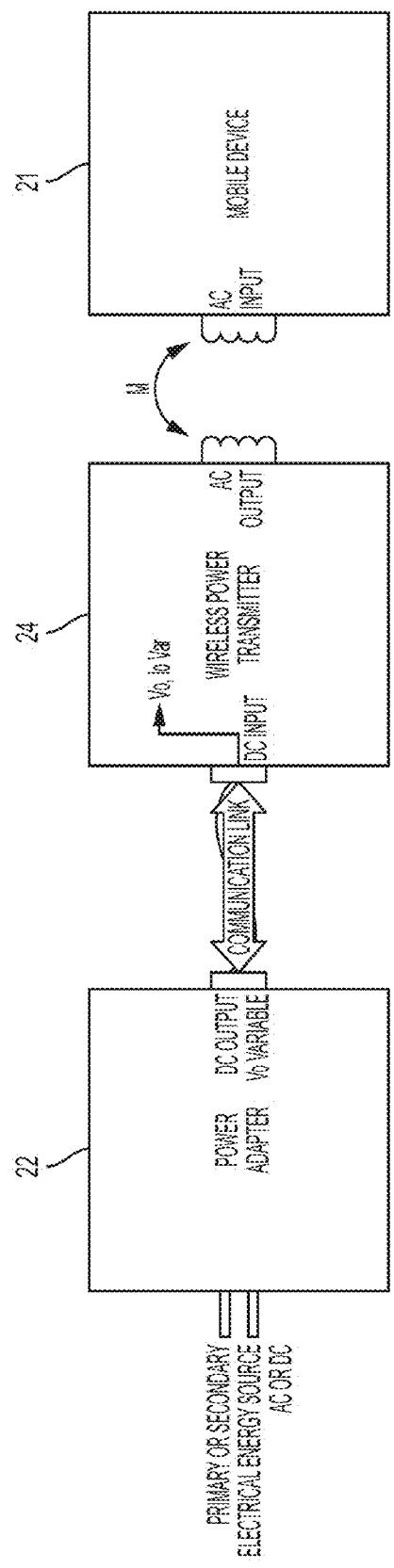
FIG. 2B shows a diagram of a wireless power transmission system including a controllable power adapter that powers a wireless power transmitter to wirelessly transmit power to a mobile device.

FIG. 2B shows a diagram of a wireless power transmission system 20 including a controllable power adapter 22 that provides power to a wireless power transmitter 24 that wirelessly transmits power to a mobile device 21. The mobile device 21 may be a device having energy storage, such as a battery, for example, that needs to be periodically connected to the power source to replenish its supply of electrical energy. Examples of mobile devices 21 include cellular telephones (e.g., smartphones), tablet computers, laptop computers, electric watch, or electric shaver, by way of illustration.

Figure 3:
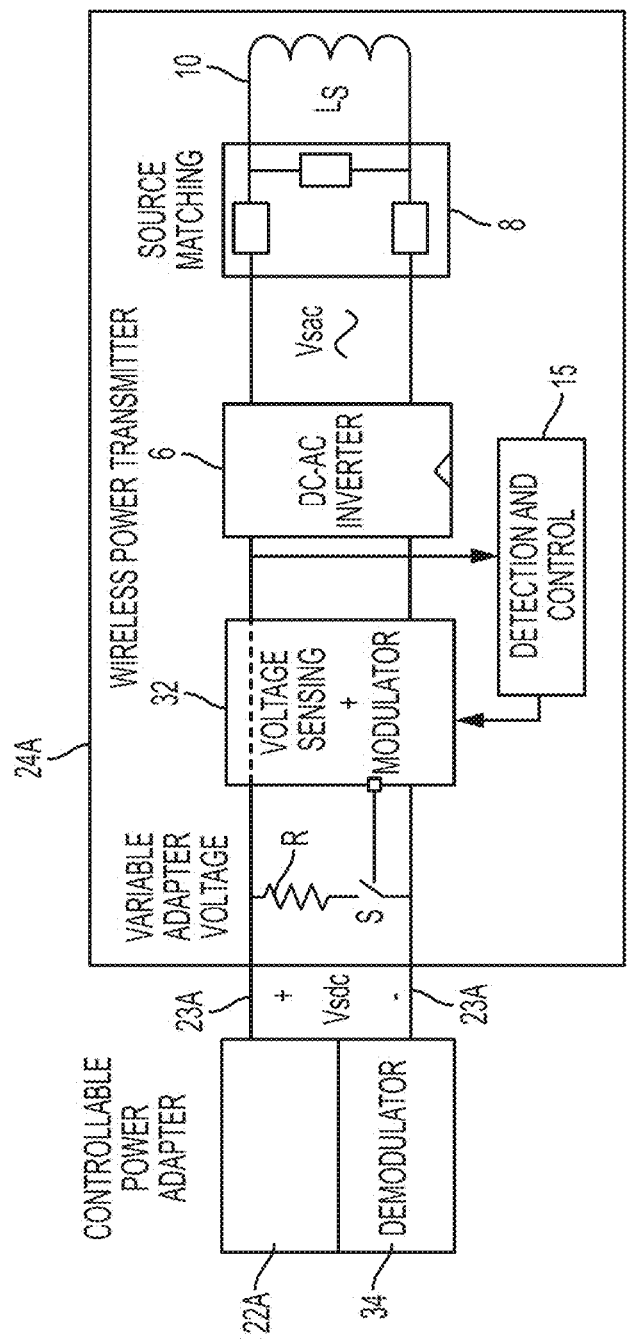
FIG. 3 shows an embodiment of a wireless power transmission system in which the wireless power transmitter sends a control signal to the controllable power adapter by modulating the power path between the controllable power adapter and the wireless power transmitter.

FIG. 3 shows an embodiment of a wireless power transmission system in which a wireless power transmitter 24A sends a control signal to the controllable power adapter 22A by modulating the power path 23A between the controllable power adapter 22A and the wireless power transmitter 24A. In the example of FIG. 3, the power path 23A includes a positive terminal and a negative terminal that provide the output voltage of the controllable power adapter 22A as voltage $V_{sdc}$ across the positive and negative terminals. To send the control signal, the wireless power transmitter 24A may modulate the power path 23A in any suitable way, such as by modulating a current and/or voltage of the power path 23A. In some embodiments, a resistor R and a switch S may be connected in series between the positive and negative terminals of the power path 23A. Turning the switch on and off modulates the current through the power path 23A, as it provides an additional current path between the positive and negative terminals of the power path 23A when the switch is turned on (e.g., conductive), and does not provide such an additional current path when the switch is turned off (e.g., non-conductive). Accordingly, the control signal can be sent to the controllable power adapter 22A from wireless power transmitter 24A by modulating the current through power path 23A, which can be detected by the controllable power adapter 22A.

The control signal may be encoded in any suitable way. In some embodiments, the control signal may be encoded with a digital control code. The digital control code may command an increase in voltage, a decrease in voltage, or a desired voltage level. The power adapter 22A may include a demodulator 34 that reproduces the digital control code from the control signal and provides the digital control code to the controller 29 (FIG. 2A) to control the AC/DC converter 30.

Figure 4:
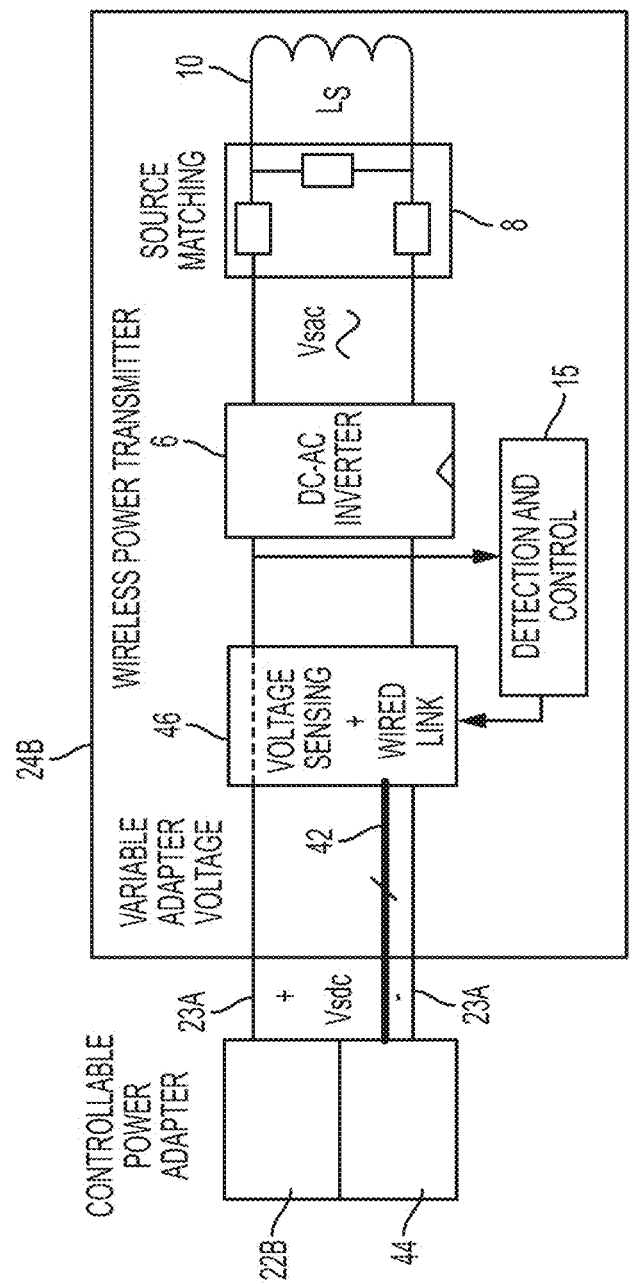
FIG. 4 shows an embodiment of a wireless power transmission system in which the wireless power transmitter sends a control signal to the controllable power adapter using a wired bus separate from the power path.

FIG. 4 shows an embodiment of a wireless power transmission system in which the wireless power transmitter 24B sends a control signal to the controllable power adapter 22B using a wired bus 42 separate from the power path 23A. A voltage sensing and wired link communication circuit 46 is configured to send the control signal to the controllable power adapter 22B. The control signal transmitted along the wired link may be analog or digital. If the control signal is transmitted digitally over a wired bus, the wired bus may be a single wire serial bus, a serial bus having a plurality of wires such as a two-wire serial bus, or a parallel bus having a plurality of wires. In some embodiments, the control signal may convey a control code, as discussed above. The controllable power adapter 22B may include a receiver 44 that receives the control signal. The power adapter 22B controls its output voltage based on the control signal received by the receiver 44.

In some embodiments, the wireless power transmitter and the controllable power adapter may be connected to one another via a Universal Serial Bus (USB) cable. Communication between the wireless power transmitter and the controllable power adapter, including providing the control signal discussed above, may be performed via the D+, D− wires of the USB cable.

Figure 5:
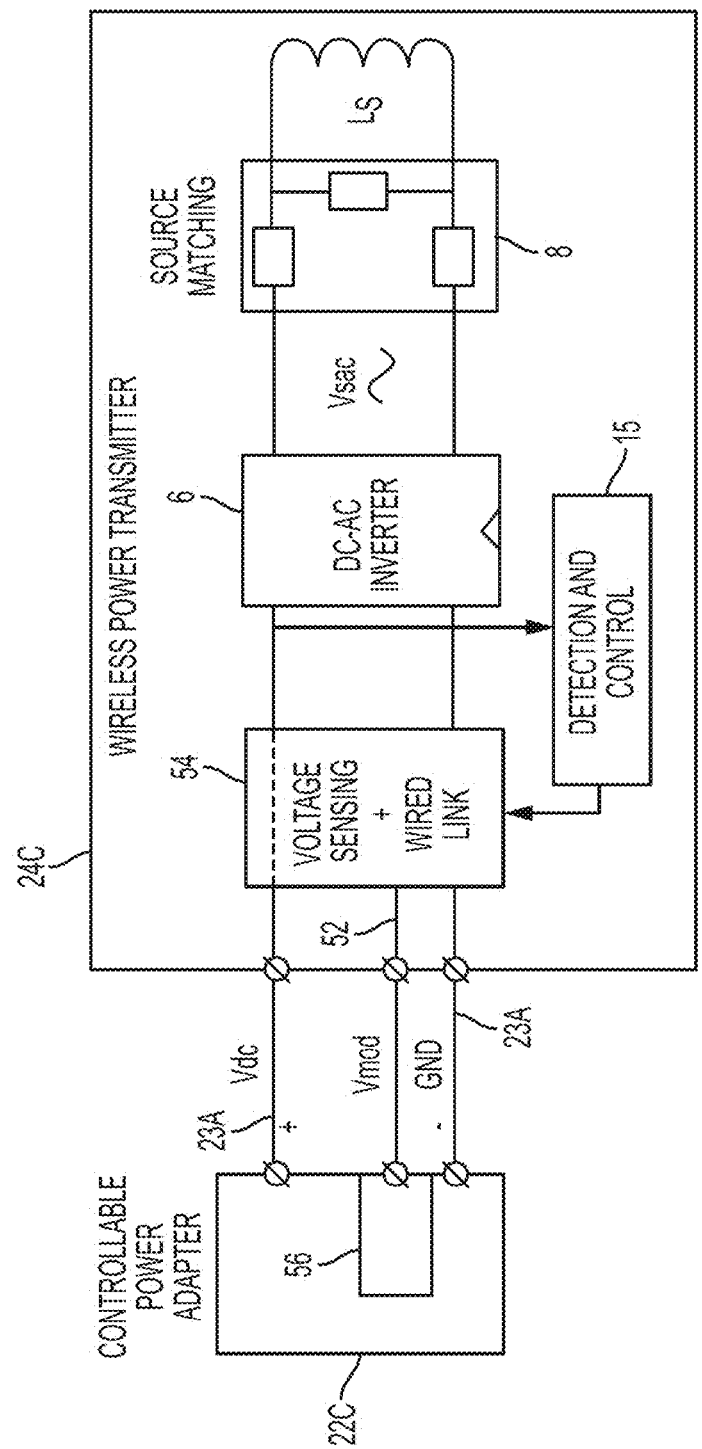
FIG. 5 shows that in some embodiments, the control signal may be an analog voltage signal.

FIG. 5 shows that in some embodiments, the control signal may be an analog voltage signal (labeled Vmod) that is a scaled version of the desired output voltage of the controllable power adapter 22. The voltage sensing and wired link circuit 54 of the wireless power transmitter 24C may generate the analog voltage signal and send it to the controllable power adapter 22C over a wired link 52, where it is received by a wired link reception circuit 56. Controllable power adapter 22C scales the received voltage by a scaling factor, and produces an output voltage accordingly. For example, if the scaling factor for the controllable power adapter is five, a control signal having a voltage of 2 V may indicate that the controllable power adapter 22 should produce an output voltage of 10 V. Any suitable scaling factor may be used. In some embodiments, all the power adapters in a product line may use the same scaling factor.

In some embodiments, the control signal sent from the wireless power transmitter to the controllable power adapter may be a digital word that indicates the output voltage that should be produced by the controllable power adapter 22. The digital word may indicate discrete values, or steps, of voltage values to be produced by the controllable power adapter 22. One example of a way in which the value of a digital word may be mapped to discrete output voltage levels is shown in Table 1. In the example of Table 1, the digital word has five bits, D0-D4, that indicate one out of thirty-two output voltages, including 0 V, and thirty-one voltage values in steps from 5 V to 20V. However, this is merely by way of illustration, as any suitable mapping between a digital word and output voltage value may be used. Values may be selected from the table in any suitable order, and in some embodiments they may be selected consecutively.

TABLE 1

| # | Vo | | D4 | D3 | D2 | D1 | D0 |
|---|---|---|---|---|---|---|---|
| 0 | OFF | 0 | 0 | 0 | 0 | 0 | 0 |
| 1 | Vomin | 5 | 0 | 0 | 0 | 0 | 1 |
| 2 | | 5.75 | 0 | 0 | 0 | 1 | 0 |
| 3 | | 6 | 0 | 0 | 0 | 1 | 1 |
| 4 | | 6.75 | 0 | 0 | 1 | 0 | 0 |
| 5 | | 7 | 0 | 0 | 1 | 0 | 1 |
| 6 | | 7.75 | 0 | 0 | 1 | 1 | 0 |
| 7 | | 8 | 0 | 0 | 1 | 1 | 1 |
| 8 | | 8.75 | 0 | 1 | 0 | 0 | 0 |
| 9 | | 9 | 0 | 1 | 0 | 0 | 1 |
| 10 | | 9.75 | 0 | 1 | 0 | 1 | 0 |
| 11 | | 10 | 0 | 1 | 0 | 1 | 1 |
| 12 | | 10.75 | 0 | 1 | 1 | 0 | 0 |
| 13 | | 11 | 0 | 1 | 1 | 0 | 1 |
| 14 | | 11.75 | 0 | 1 | 1 | 1 | 0 |
| 15 | | 12 | 0 | 1 | 1 | 1 | 1 |
| 16 | | 12.75 | 1 | 0 | 0 | 0 | 0 |
| 17 | | 13 | 1 | 0 | 0 | 0 | 1 |
| 18 | | 13.75 | 1 | 0 | 0 | 1 | 0 |
| 19 | | 14 | 1 | 0 | 0 | 1 | 1 |
| 20 | | 14.75 | 1 | 0 | 1 | 0 | 0 |
| 21 | | 15 | 1 | 0 | 1 | 0 | 1 |
| 22 | | 15.75 | 1 | 0 | 1 | 1 | 0 |
| 23 | | 16 | 1 | 0 | 1 | 1 | 1 |
| 24 | | 16.75 | 1 | 1 | 0 | 0 | 0 |
| 25 | | 17 | 1 | 1 | 0 | 0 | 1 |
| 26 | | 17.75 | 1 | 1 | 0 | 1 | 0 |
| 27 | | 18 | 1 | 1 | 0 | 1 | 1 |
| 28 | | 18.75 | 1 | 1 | 1 | 0 | 0 |
| 29 | | 19 | 1 | 1 | 1 | 0 | 1 |
| 30 | | 19.75 | 1 | 1 | 1 | 1 | 0 |
| 31 | Vomax | 20 | 1 | 1 | 1 | 1 | 1 |

In some embodiments, a digital communication protocol is established between the wireless power transmitter and the controllable power adapter. The communication protocol may include codes that command the controllable power adapter to shut down or perform other functions. Commands may be provided according to the digital communication protocol through any suitable interface, including a wired or wireless interface. The interface may be a serial or parallel interface. In some embodiments, the communication protocol may allow two-way communication between the wireless power transmitter and the controllable power adapter. The controllable power adapter may send information to the wireless power transmitter about its operating modes, such as one or more voltages or currents within the power adapter, the temperature of one or more components, or a service command that alters the operation of the wireless power transmitter. As an example of a service command, the power adapter may communicate an approval that payment has been received for performing wireless charging, to enable the wireless power transmitter. Other examples of service commands include the following: a command that turns on the power adapter; a command that turns off the power adapter; a command that sets a maximum output current of the power adapter; and a command that executes a test sequence of DC output voltages of the power adapter.

In some embodiments, a controllable power adapter may employ a digital potentiometer as part of its output voltage setting feedback network. The output voltage setting feedback network may include a voltage divider that includes the digital potentiometer. Changing the resistance of the digital potentiometer changes the feedback voltage, which controls the DC output voltage. The digital potentiometer may have series or parallel inputs and may be capable of receiving codes and changing its value based on codes received. The feedback network may designed in such a way that the output voltage changes when impedance between terminals of the digital potentiometer changes based in input codes.

Figure 6:
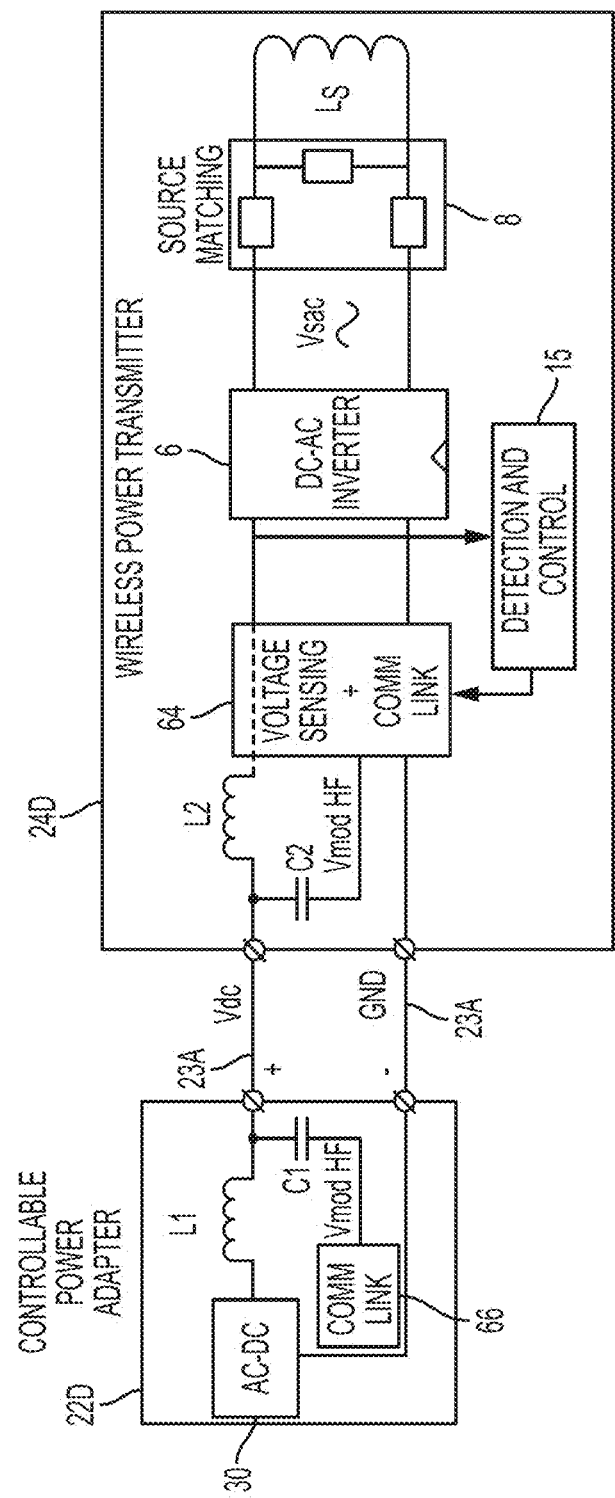
FIG. 6 shows an embodiment of a wireless power transmission system in which communication between the wireless power transmitter and the power adapter is performed by transmitting an AC signal through the power path.

FIG. 6 shows an embodiment of a wireless power transmission system in which communication between the wireless power transmitter and the power adapter is performed by transmitting an AC signal through the power path 23A. The AC signal may be superimposed on the DC signal of the power path 23A. In some embodiments, communication over the power path 23A may be performed using an AC signal having a sufficiently high frequency such that the AC signal flows through the capacitors C1 and C2 between the communication links circuits 64 and 66, and is substantially blocked by the inductors L1 and L2. The AC signal may be a control signal modulated with a control code, as discussed above. The AC signal may be modulated by amplitude modulation or frequency modulation. FIG. 6 shows the wireless power transmitter 24D includes a voltage sensing and communication link circuit 64 that produces a modulated AC signal $V_{mod}$ HF which is transmitted to the communication link circuit 66 of the controllable power adapter 22D through capacitors C1 and C2 and the power path 23A. The controllable power adapter 22D is shown to include an AC/DC converter 30 that produces an output DC voltage of the controllable power adapter 52 and provides power to the wireless power transmitter 24 through the inductors L1 and L2 and power path 23A.

Figure 7:
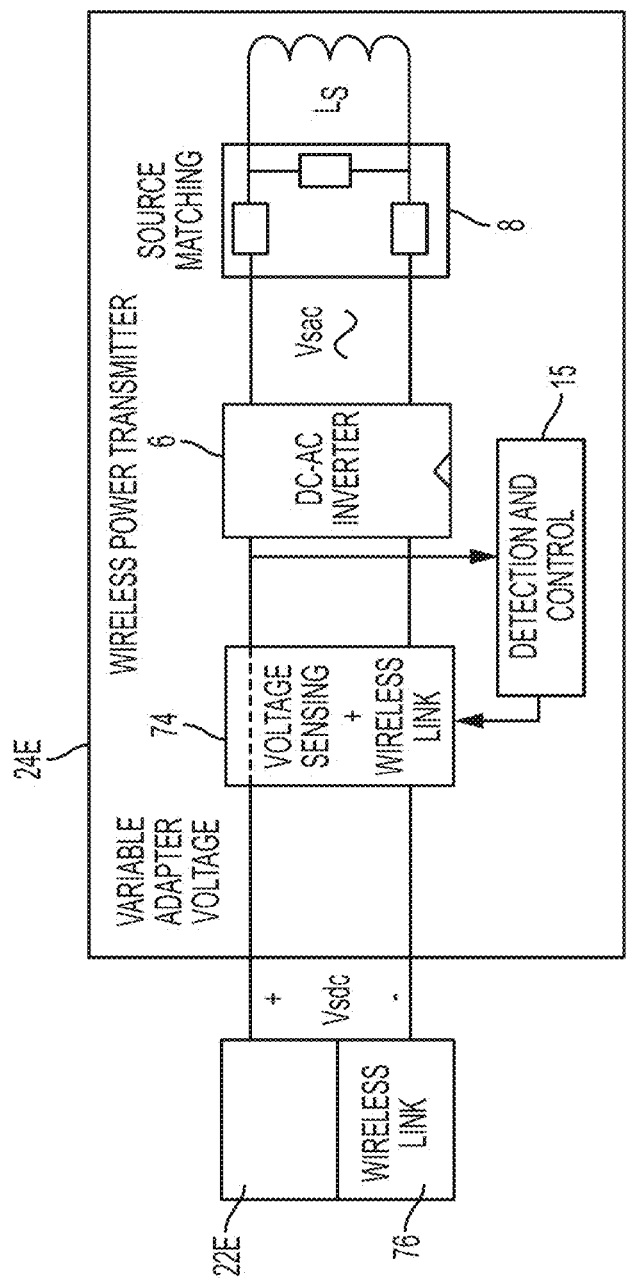
FIG. 7 shows an embodiment of a wireless power transmission system in which communication between the wireless power transmitter and the power adapter is performed using wireless communication.

FIG. 7 shows an embodiment of a wireless power transmission system in which communication between the wireless power transmitter and the power adapter is performed using wireless communication. Wireless power transmitter 24E includes a voltage sensing and wireless link circuit 74, which may include a wireless transmission unit that transmits signals wirelessly to the controllable power adapter 22E using any suitable wireless communication medium, such as radio waves. Any suitable communication protocol may be used, such as Bluetooth, 802.11x, etc. Any suitable communications may take place between the wireless power transmitter 24E and the controllable power adapter 22E, such as transmission of a control signal to the controllable power adapter 22E. The controllable power adapter 22E includes a wireless link circuit 76 configured to communicate wirelessly with the wireless power transmitter 24E.

Figure 8:
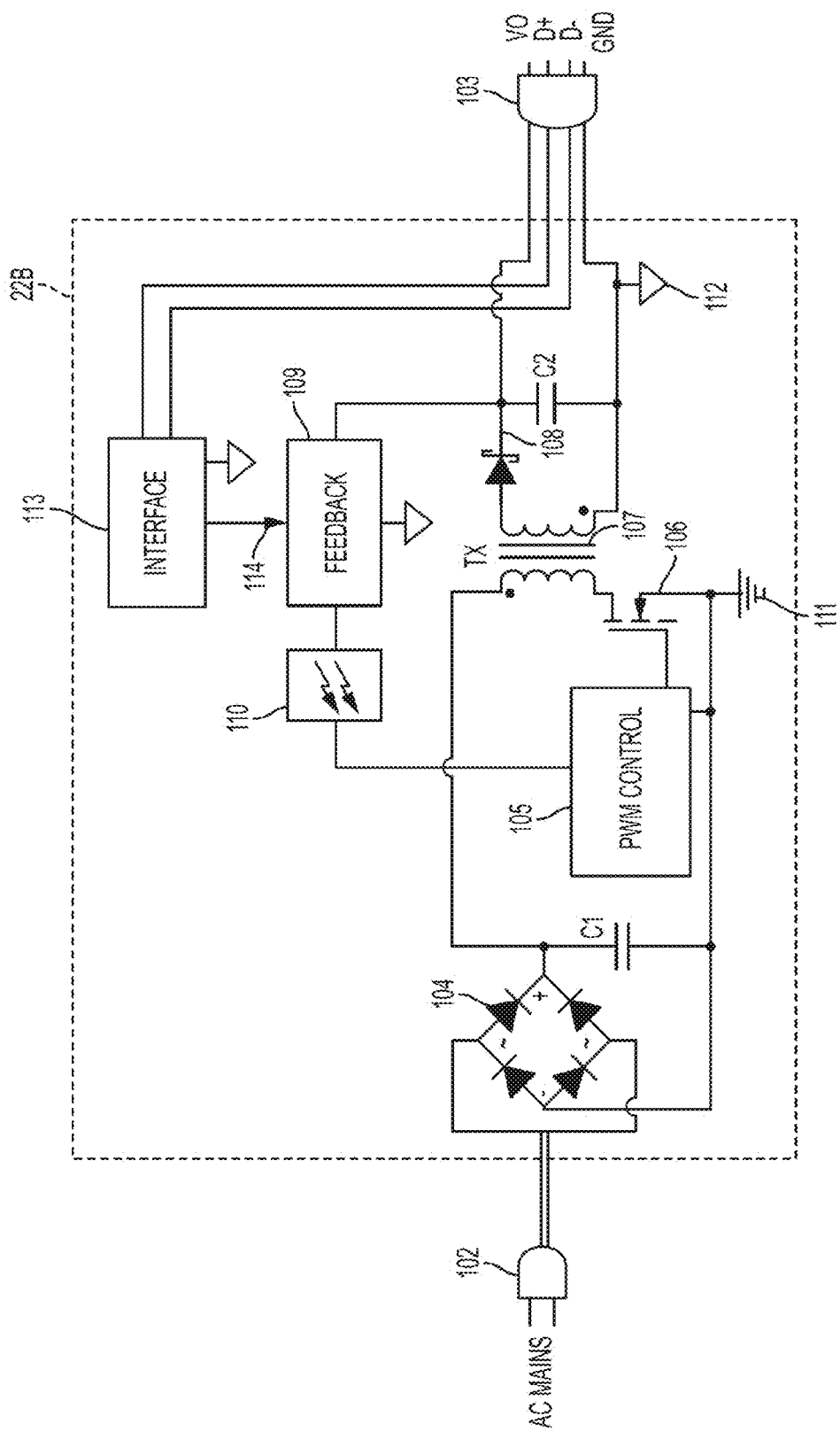
FIG. 8 shows an example of a controllable power adapter, according to some embodiments.

FIG. 8 shows an example of a controllable power adapter 22B, according to some embodiments. The controllable power adapter 22B may be connected to receive an input voltage from the AC mains from a plug 102. In some embodiments, plug 102 may be a standard plug shaped to fit into a standard wall socket. The controllable power adapter 22B includes a rectifier 104 configured to rectify the AC mains voltage. Although rectifier 104 is illustrated as a full bridge rectifier, the techniques described herein are not limited in this respect, as in some embodiments rectifier 104 may be a half-bridge rectifier. A pulse width modulation (PWM) control circuit 5 is coupled to a power transistor 106 and controls the power transistor 106 to periodically engage transformer 107. Transformer 107 has a secondary winding coupled to the secondary side rectifier 108. The output of the secondary side rectifier 108 is delivered to the wireless power transmitter 24 via a USB connector 103. The controllable power adapter 22B includes a feedback circuit 109 that senses the output voltage of the secondary side rectifier 108 and alters operation of the PWM control circuit 105 to perform closed-loop regulation of the controllable power adapter 22B based on the control signal. The feedback circuit 109 controls the PWM control circuit 105 via an isolation component 110 that can provide optical or magnetic isolation. Examples of such components include an optocoupler and a transformer, respectively. The isolation component 110 allows galvanically decoupling the circuitry of the controllable power adapter 22B referenced to the primary ground 111 from the output circuitry (e.g., secondary side rectifier 108 and USB connector 103) referenced to the secondary side ground 112. The interface circuit 113 is coupled to feedback circuit 109 via connections 114 to control feedback circuit 109. Interface circuit 113 is coupled to receive the control signal from the terminals D+, D− of the USB connector 103. When operating, the interface circuit 113 is configured to alter the regulation point (i.e., output voltage level) of the controllable power adapter 22B and its output voltage in accordance with control signal received over D+, D− wires of USB connector 103. The control signal received from the USB connector 103 may be a digital signal. However, the techniques described herein are not limited in this respect, as in some embodiments the control signal may be conveyed in analog form. For example, the interface circuit 113 may alter the regulation point of the controllable power adapter 22B based on either an analog voltage established on one of the inputs D+ or D−, or the difference of voltage between the voltages of D+, D−. Further, as described above, the techniques described herein are not limited to conveying the control signal via a USB connection, as in some embodiments the control signal may be sent using another type of wired link, which may be the same or different from the power link, or via wireless link.

Figure 9:
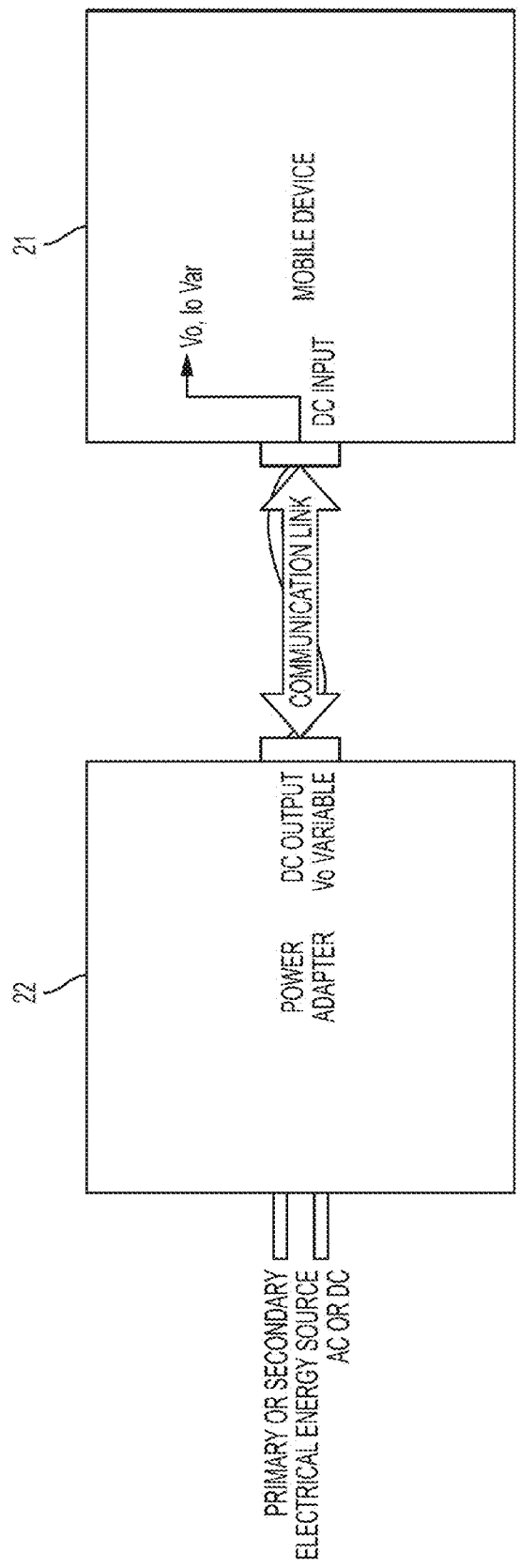
FIG. 9 shows an embodiment in which a mobile device is powered by the controllable power adapter over a wired link.

FIG. 9 shows an embodiment in which a mobile device 21 is powered by the controllable power adapter 22 over a wired link. The wired link may be a cord, cable, wire or other flexible connection that allows flexibility in the positioning of the mobile device. The controllable power adapter 22 has a variable output voltage that can be controlled by the mobile device 21 based on its requirements. The mobile device 21 may communicate with the power adapter 22 using any of the techniques described herein. In some embodiments, mobile device 21 does not include a DC/DC converter, as it can control the output voltage of the power adapter 22, as discussed above.

Figure 10:
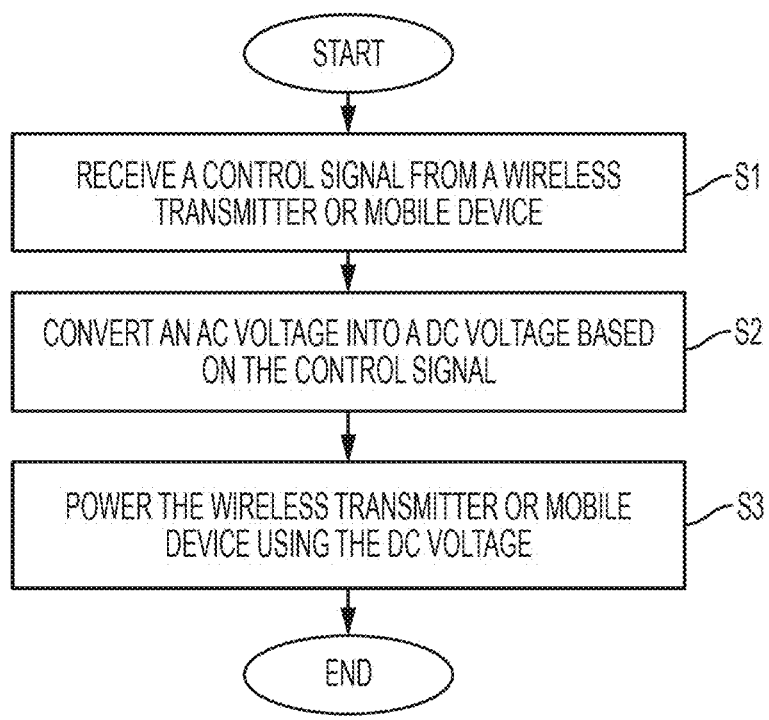
FIG. 10 shows a method of powering a wireless power transmitter or mobile device, according to some embodiments.

FIG. 10 shows a method of powering a wireless power transmitter or mobile device, according to some embodiments. In some embodiments, the method of FIG. 10 may be performed by the controllable power adapter 22. In step S1, a control signal is received from the wireless power transmitter or mobile device. In step S2, an AC voltage is converted into a DC voltage based upon the control signal. In step S3, the wireless transmitter or mobile device is powered using the DC voltage.

Figure 11:
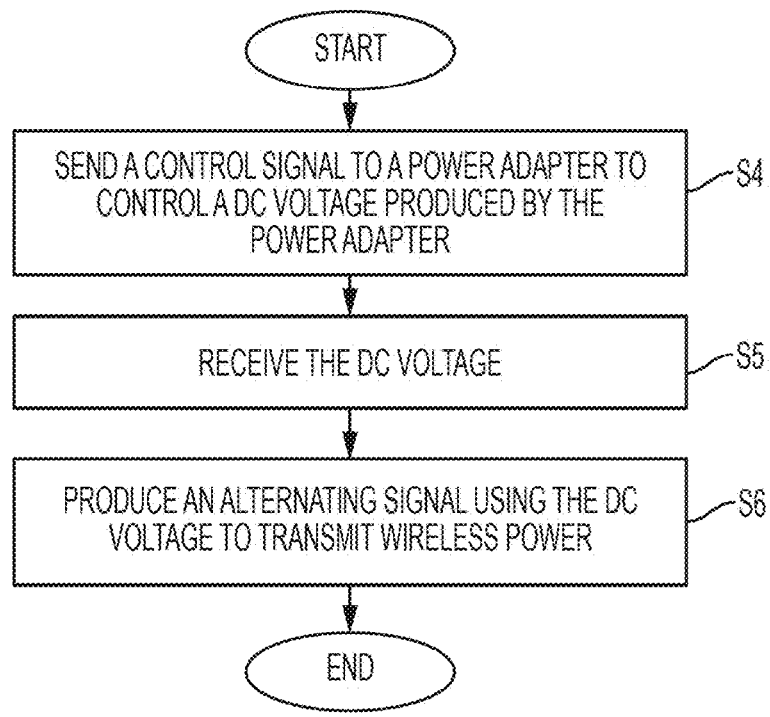
FIG. 11 shows a method of wireless power transmission, according to some embodiments.

FIG. 11 shows a method of wireless power transmission, according to some embodiments. In some embodiments, the method of FIG. 11 may be performed by the wireless power transmitter 24. In step S4, a control signal is sent to the power adapter to control the DC voltage produced by the power adapter. In step S5, the DC voltage is received from the power adapter. In step S6, an alternating signal is produced using the DC voltage, which can be provided to the transmit coil 10, thereby transmitting wireless power.

Controllers 26 and 29 as described herein may be implemented by any suitable type of circuitry, using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. For example, an apparatus, structure, device, layer, or region recited as "including," "comprising," or "having," "containing," "involving," a particular material is meant to encompass at least the material listed and any other elements or materials that may be present.

What is claimed is:

1. A system, comprising:
a first device, the first device being a wireless power transmitter or mobile device; and
a power adapter external to the first device, the power adapter being configured to:
receive a control signal and to control a DC output voltage of the power adapter based upon the control signal, and
send, to the first device, a first service command that alters an operation of the first device, and
wherein the first device is configured to:
send the control signal to the power adapter to control the DC output voltage of the power adapter, and
send a second service command to the power adapter, wherein the second service command controls an aspect of the power adapter other than the DC output voltage of the power adapter, and the second service command includes a command that executes a test sequence of DC output voltages of the power adapter.

2. The system of claim 1, wherein the power adapter comprises an AC/DC converter that produces the DC output voltage of the power adapter having a magnitude determined based on the control signal.

3. The system of claim 2, wherein the power adapter is configured to receive an AC line voltage at an input of the power adapter.

4. The system of claim 1, wherein the power adapter comprises a DC/DC converter that produces the DC output voltage of the power adapter having a magnitude determined based on the control signal.

5. The system of claim 1, wherein the first device is configured to send the control signal to the power adapter by modulating an output current of the power adapter.

6. The system of claim 1, wherein the first device is configured to send the control signal to the power adapter by superimposing an AC signal on the DC output voltage of the power adapter.

7. The system of claim 6, wherein the AC signal amplitude or frequency is modulated.

8. The system of claim 1, wherein the first device is configured to send the control signal to the power adapter by a wired link.

9. The system of claim 8, wherein the control signal is an analog signal.

10. The system of claim 8, wherein the control signal is a digital signal.

11. The system of claim 10, wherein the wired link is a single-wire serial bus.

12. The system of claim 10, wherein the wired link is a two-wire serial bus.

13. The system of claim 10, wherein the wired link is a parallel bus having a plurality of wires.

14. The system of claim 1, wherein the first device is configured to send the control signal to the power adapter by a wireless link.

15. The system of claim 1, wherein the first device does not include a DC/DC converter.

16. The system of claim 1, wherein the first device is a wireless power transmitter configured to wirelessly provide power to a wireless power receiver, and wherein the wireless power transmitter is configured to produce the control signal based upon a signal received by the wireless power transmitter from the wireless power receiver.

17. The system of claim 1, wherein the first device is disposed in a first housing and the power adapter is disposed in a second housing separate from the first housing.

18. The system of claim 1, wherein the control signal has a digital value representing a selected DC output voltage of the power adapter.

19. The system of claim 18, wherein the digital value is selected from a voltage identification table used by the power adapter and the first device.

20. The system of claim 19, wherein the voltage identification table comprises a plurality of digital values that can be selected in any order.

21. The system of claim 19, wherein the voltage identification table comprises a plurality of digital values that are selected sequentially.

22. A wireless power transmitter, comprising:
an inverter configured to receive a DC output voltage from a power adapter external to the inverter and to produce an alternating signal to transmit wireless power;
a controller configured to send a control signal to the power adapter to control the DC output voltage of the power adapter; and
an interface, via which, the wireless power transmitter is configured to:
receive, from the power adapter, a first service command that alters an operation of the wireless power transmitter, and
send a second service command to the power adapter, wherein the second service command controls an aspect of the power adapter other than the DC output voltage of the power adapter, and the second service command includes a command that executes a test sequence of DC output voltages of the power adapter.

23. The wireless power transmitter of claim 22, wherein the wireless power transmitter is configured to wirelessly provide power to a wireless power receiver, and wherein the wireless power transmitter is configured to produce the control signal based upon a signal received by the wireless power transmitter from the wireless power receiver.

24. The wireless power transmitter of claim 22, wherein the wireless power transmitter is configured to send the control signal to the power adapter by modulating an output current of the power adapter.

25. The wireless power transmitter of claim 22, wherein the wireless power transmitter is configured to send the control signal to the power adapter by superimposing an AC signal on the DC output voltage of the power adapter.

26. The wireless power transmitter of claim 25, wherein the AC signal is modulated by amplitude or frequency modulation.

27. The wireless power transmitter of claim 22, wherein the wireless power transmitter is configured to send the control signal to the power adapter by a wired link.

28. The wireless power transmitter of claim 22, wherein the wireless power transmitter is configured to send the control signal to the power adapter by a wireless link.

29. The wireless power transmitter of claim 22, wherein the wireless power transmitter does not include a DC/DC converter.

30. The wireless power transmitter of claim 22, wherein the control signal has a digital value representing a selected DC output voltage of the power adapter.

31. The wireless power transmitter of claim 30, wherein the digital value is selected from a voltage identification table used by the power adapter and the wireless power transmitter.

32. The wireless power transmitter of claim 31, wherein the voltage identification table comprises a plurality of digital values that can be selected in any order.

33. The wireless power transmitter of claim 31, wherein the voltage identification table comprises a plurality of digital values that are selected sequentially.

34. A power adapter for a first device, the first device being a wireless power transmitter or a mobile device, the power adapter comprising:
an AC/DC converter configured to receive an AC voltage and produce a DC output voltage of the power adapter;
a controller configured to receive a control signal from the first device and control the DC output voltage of the power adapter based on the control signal; and
an interface, via which, the power adapter is configured to:
send, to the first device, a first service command that alters an operation of the first device, and
receive a second service command from the first device, wherein the second service command controls an aspect of the power adapter other than the DC output voltage of the power adapter, and the second service command includes a command that executes a test sequence of DC output voltages of the power adapter.

35. The power adapter of claim 34, wherein the AC/DC converter is configured to receive an AC line voltage and produce the DC output voltage using the AC line voltage.

36. The power adapter of claim 34, wherein the controller is configured to receive the control signal over a wired link or a wireless link.

37. A method performed by a power adapter, comprising:
receiving, a control signal from a first device, the first device being a wireless transmitter or mobile device;
converting an AC voltage into a DC output voltage based on the control signal;
powering the first device using the DC output voltage;
sending, to the first device, a first service command that alters an operation of the first device; and receiving a second service command from the first device, wherein the second service command controls an aspect of the power adapter other than the DC output voltage of the power adapter, and the second service command includes a command that executes a test sequence of DC output voltages of the power adapter.

38. A method performed by a wireless power transmitter, comprising:

sending a control signal to a power adapter to control a DC output voltage produced by the power adapter from an AC voltage;

receiving the DC output voltage;

producing an alternating signal using the DC output voltage to transmit wireless power;

receiving, from the power adapter, a first service command that alters an operation of the wireless power transmitter; and sending, a second service command to the power adapter, wherein the second service command controls an aspect of the power adapter other than the DC output voltage of the power adapter, and the second service command includes a command that executes a test sequence of DC output voltages of the power adapter.

\* \* \* \* \*